June 27, 1967
G. D. ROBB
3,327,550
MECHANICAL DRIVE ELEMENT
Filed Aug. 6, 1965
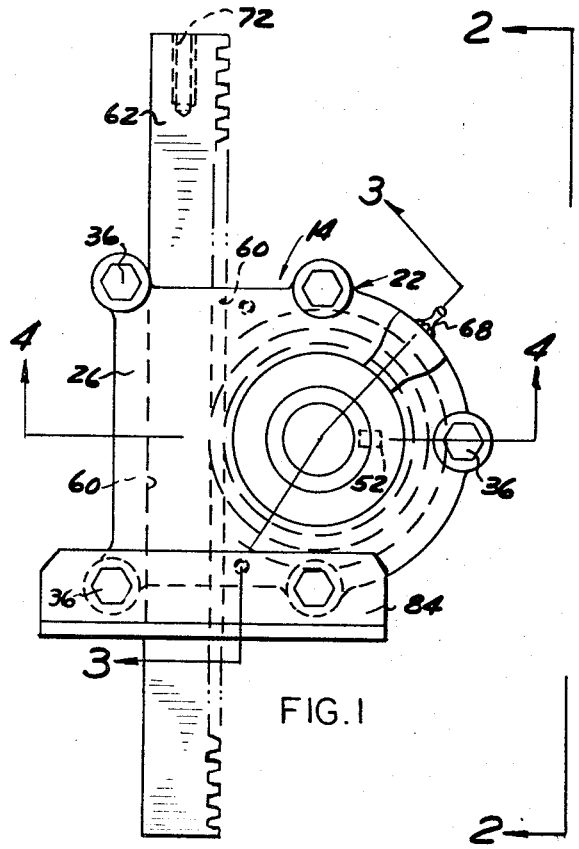
FIG. 1
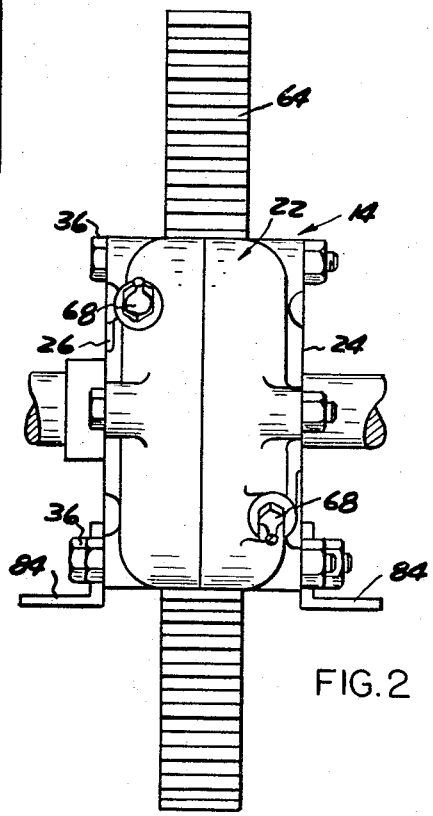
FIG. 2
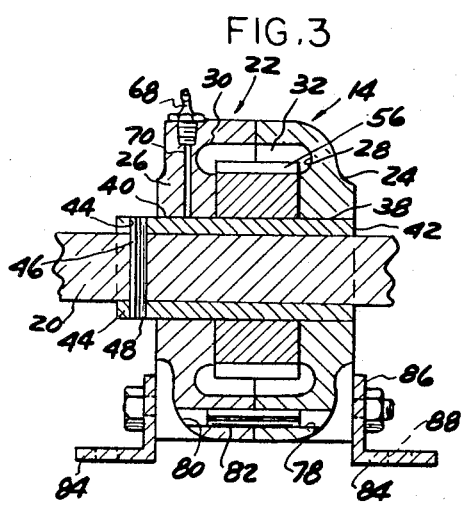
FIG. 3
FIG. 4
INVENTOR
GEORGE D. ROBB
BY *Allen M. Krass*
ATTORNEY United States Patent Office 3,327,550
Patented June 27, 1967

3,327,550
MECHANICAL DRIVE ELEMENT
George D. Robb, Southfield, Mich., assignor to Federal Engineering Company, Detroit, Mich., a corporation of Michigan
Filed Aug. 6, 1965, Ser. No. 477,898
6 Claims. (Cl. 74—422)

ABSTRACT OF THE DISCLOSURE

A housing having an internal cavity is formed of a pair of halves bolted together. The housing has a pair of circular apertures aligned about a first axis that passes through the cavity and a pair of rectangular apertures aligned about a second axis that passes through the cavity and is normal to and displaced from the first axis. A circular gear is supported by a spindle journaled in the first pair of apertures and a rack is supported by the second pair of apertures so as to mesh with the gear. Sides of both the gear and the rack are in abutment with the internal sides of the housing so as to provide bearing surfaces.

---

This application is a continuation-in-part of patent application Ser. No. 366,051, filed May 8, 1964, now Patent No. 3,213,657, which is in turn a continuation-in-part of patent application Ser. No. 199,922, filed June 4, 1962, now Patent No. 3,195,562.

This invention relates to a mechanical drive element operative to convert rotational motion about one axis into linear motion along a line perpendicular to that axis and more particularly to such a unit which incorporates bearing supports for both the linear and rotational elements.

Rack and pinion mechanisms for converting rotational motion to linear motion or visa-versa, are commonly employed in machines and material handling equipment. For example, knock-out units for mechanical presses are conventionally formed by driving a rotational shaft in timed relation to the motion of the press and converting the rotational motion of the shaft into a linear reciprocation by driving racks which serve as knockouts. In such installations it is necessary to provide a number of bearing blocks to support the shaft and a special slide mechanism to support the rack. Such arrangements are often unsatisfacory unless special care is taken to accurately align the supporting mechanisms for the gear and rack and heavy bearings are provided on both sides of each element.

The present invention accordingly contemplates a single unit which provides bearing surfaces for receiving and supporting a shaft and a rack and moreover provides bearing action on both sides of the shaft and the rack so as to maintain the two in rigid, accurate alignment with respect to one another. The present invention further provides a base support so that the single unit may be mounted in the manner of a pillow block. In this manner a single unit formed in accordance with the present invention surplants an individual gear and rack mechanism, a pair of bearing or pillow blocks supported on each side of the rotational shaft and a slide supporting both sides of the reciprocating rack. By providing a single unit incorporating all these features economies of space, cost and material are achieved which are not possible with use of components of the prior art.

A wide variety of mechanical arrangements are possible employing the concept of the present invention. For example, the unit might incorporate a pair of racks disposed at right angles with respect to one another and driven by a single gear so that they extend and retract at the same speed at one another upon rotation of the shaft. Alternatively, the two racks might be driven by different gears so that they move inwardly and outwardly in timed relation to one another but at a particular speed ratio such as two to one. Such units are useful in a wide variety of manufacturing situations.

As disclosed in the following detailed description, a preferred embodiment of the invention incorporates a housing formed of a pair of halves and containing a central cavity. A hollow spindle or quill is rotatably supported in the two halves so as to extend axially through the cavity. The quill is keyed to a pinion that is disposed within the cavity and has its sides in bearing relation to the two cavity halves. The cavity also supports three sides of a rack bar which passes through holes in the housing projecting normally to the axis of the shaft and has its gear rack in meshed engagement with the gear of the pinion.

The hollow spindle or quill is attached to steel shafting which is to undergo the rotational motion. The quill acts to provide bearing surfaces on both sides of the pinion. In this manner the present device not only surplants a pair of pillow blocks but also provides thrust action against the sides of the pinion in an integrated structure which could not be duplicated by previously available components. The rack member is supported in a three-sided slot within the housing with its geared facing in mesh with the pinion. Since this rack supporting housing is formed integrally with the bearing supporting housing for the shaft no possibility exists of the rack falling out of alignment with respect to the shaft. The housing has a base member which allows it to be attached to a supporting surface in the same manner as a pillow block. Actually the entire unit only requires a little more space than would a single bearing support of the normal variety. The use of a hollow spindle allows a number of the inventive units to be aligned with respect to one another and joined with standard shafting into a variety of configurations.

It is thus seen that the primary object of the present invention is to provide a single mechanical unit which is adapted to receive a rotational shaft and to provide a linear motion at right angles to the axis of the shaft as well as bearing supports for the shaft on both sides of the pinion and for the rack.

Other objects, advantages and applications of the present invention will be made apparent by the following detailed description of the preferred embodiment of the invention. The description makes reference to the accompanying drawings, in which:

FIGURE 1 is a side elevation of one of the units formed in accordance with the present invention, with a driving shaft shown in cross-section;

FIGURE 2 is a front elevation, looking from the right in the direction of the arrows 2—2 of FIGURE 1;

FIGURE 3 is a horizontal section looking upward in the direction of the arrows 3—3 of FIGURE 1; and FIGURE 4 is a broken section taken along the oblique line 4—4 of FIGURE 1.

The preferred embodiment of the invention is built around a housing structure, generally designated 22, which consists of a pair of oppositely-facing housing halves 24 and 26 containing cavities 28 and 30 respectively which in cooperation form a pinion chamber 32. The housing halves 24 and 26 meet along a junction plane 34 (FIGURE 4) and are bolted together at this plane by through bolts 36. The housing halves 24 and 26 are provided with aligned bores 38 and 40 (FIGURE 3) in which a tubular spindle or quill 42 is rotatably mounted. The quill 40 for satisfactory bearing performance is conveniently made of bronze and is provided with diametrically-aligned holes 44 which in turn are aligned with a diametral hole 46 in a rotational shaft 20. The quill 42 is slightly longer than the thickness of the housing structure 22 so that the end containing the aligned holes 44 projects beyond the housing structure 22 (FIGURE 3). Mounted in the holes 44 and 46 is a roll pin 48 in the form of a longitudinally-split tube of resilient metal, such as steel, which expands or contracts to tightly engage holes of slightly differing diameters. This construction enables manufacturing tolerances to be liberalized without introducing lost motion in the drive.

The quill or tubular spindle 42 within the chamber 32 is provided with a recess or key seat 50 (FIGURE 4) in which is seated a Woodruff key 52 of segmental shape. The key seat 50 is preferably of arcuate shape because of the greater ease and lower cost of machining such a seat than of milling a longitudinal keyway in the tubular shaft 42. The key 52 engages an axial keyway 54 in a pinion 56 mounted within the chamber 32 and thereby drivingly connected to the quill or tubular shaft 42. The chamber 32 opens into a lateral chamber extension 58 having upper and lower bearing bores 60 of rectangular cross-section containing a reciprocable rack bar 62, the teeth 64 of which mesh with the pinion teeth 66. As a result of this construction, rotation of the shaft 20, transmitted to the quill 42 through the roll pin 48 is further transmitted through the key 52 to the pinion 56 and thence to the rack bar 62, reciprocating the latter. Lubricant is conveyed to the housing structure 22 by means of a lubricating fitting 68 threaded into the upper end of a lubricant passageway 70 in each housing half 24 and 26 and leading to the bore 40 whence it spreads along the outer surface of the quill 42 to the bore 38 and into chamber 32 adjacent the pinion 56. The rack bar 62 at its upper end is provided with a threaded socket 72 (FIGURE 1) for connecting it to further motion-transmitting elements. The housing halves 24 and 26 near their peripheries are provided with aligned bores 78 and 80 to receive a roll pin 82 similar to the roll pin 48 and provided for the purpose of lining up the housing halves 24 and 26.

Each unit includes leg members comprising a pair of angle bars 84, the opposite arms of which are drilled as at 86 and 88. The angle bars 84 are fixed to the housing 22 by passing the bolts 36 through the holes 86 so that one angle bar 84 is retained between the heads of a pair of bolts 36 on one side of the housing and the other angle bar 84 is retained in the other side of the housing between the nuts and the housing.

In use, either the rack bar 62 or the shaft 20 may be connected to a driving element, and the other member may be connected to the driven element. Any thrust on the shaft 20 will be taken up by the surface contact between the sides of the pinion 56 and the adjacent sides of the housing. Similarly the rack 62 abuts the three sides of the lateral chamber extension 88 to provide a sliding housing for the rack.

It is therefore seen that the present invention provides a single unit which converts a rotary into linear motion or visa-versa with the unique arrangement of bearing surfaces in an efficient and economical manner.

Having thus described my invention, I claim:

1. A machine of the type described, comprising: an enclosed housing having a central cavity therein; a hollow spindle having its ends rotatably journaled in the sides of the housing and passing through the center of the cavity; a gear fixed to the spindle and disposed within the cavity; an elongated bar, rectangular in cross-section, having a rack formed on one side thereof, said rack bar passing through said cavity at right angles to said spindle, having its rack in driving engagement with said spindle, and having its three faces without gearing formed thereon in contact with three supporting surfaces formed in the cavity of the housing; and means for fixing said housing to a supporting surface.

2. A machine of the type described, comprising: an enclosed housing having a central cavity therein; a hollow spindle having its ends rotatably journaled in the sides of the housing and passing through the center of the cavity; means formed on the spindle for locking it to an elongated shaft; a gear fixed to the spindle and disposed within the cavity; an elongated bar, rectangular in cross-section, having a rack formed on one side thereof, said rack bar passing through said cavity at right angles to said spindle and having its rack in driving engagement with said spindle; and means for fixing said housing to a supporting surface.

3. A machine element of the type described, comprising: a housing formed of a pair of halves each containing cavities; means for locking the halves together with the cavities in abutting relation to form a closed housing with a central internal cavity; a first pair of apertures in the housing aligned along a first axis with respect to one another; a second pair of apertures in the housing aligned along a second axis with respect to one another, said second axis being at right angles to said first axis and being displaced therefrom; a hollow spindle rotatably supported in the first apertures so as to extend through said cavity; a pinion fixed to said spindle within said cavity; a rack bar passing through the second set of apertures in the housing and having its gearing in mesh with the pinion; and three supporting surfaces on the interior of the housing disposed parallel to the second axis, and abutting the three non-gear bearing surfaces of the rack.

4. The machine element of claim 3 wherein the two housing halves are joined together by bolts and support members consisting of angular sections are joined to the housing by said bolts.

5. A machine element of the type described, comprising: a pair of substantially identical housing halves each having a cavity formed on one face; bolt means for joining the halves together to form a housing having a central cavity therein; a first pair of circular apertures formed in the opposed side walls of the cavity aligned along a first axis; a tubular spindle of a bearing material rotatably supported within said first aperture so as to extend across the cavity; a gear fixed to said spindle within said cavity; a plurality of projections on the sides of said cavity abutting the sides of the gear; a second pair of apertures in the housing disposed along an axis which extends perpendicularly to the first axis; a rod, rectangular in cross-section, supported within said second pair of apertures; a plurality of projections from the side walls of the housing to the cavity, projecting against three sides of the rods; a rack formed on the fourth side of the rod in meshed engagement with the pinion, whereby rotational movement of the pinion causes an axial movement of the rack.

6. The machine element of claim 5 wherein the housing has means for supporting it with respect to a base.

References Cited

UNITED STATES PATENTS

| | | | |
|---|---|---|---|
| 2,842,976 | 7/1958 | Young | 74—425 |
| 2,856,817 | 10/1958 | Garden | 74—422 |
| 2,859,630 | 11/1958 | Hatch | 74—422 X |
| 3,048,051 | 8/1962 | Pickles | 74—425 |
| 3,213,657 | 10/1965 | Robb. | |
| 3,268,273 | 8/1966 | Robb | 308—3 |

DONLEY J. STOCKING, *Primary Examiner.*

L. H. GERIN, *Assistant Examiner.*

UNITED STATES PATENT OFFICE

CERTIFICATE OF CORRECTION

Patent No. 3,327,550                                  June 27, 1967

George D. Robb

It is certified that error appears in the above identified patent and that said Letters Patent are hereby corrected as shown below:

Column 1, lines 29 and 30, "Ser. No. 199,922, filed June 4, 1962, now Patent No. 3,195,562." should read -- Ser. No. 199,923, filed June 4, 1962, now abandoned. --.

Signed and sealed this 12th day of August 1969.

(SEAL)
Attest:

Edward M. Fletcher, Jr.                         WILLIAM E. SCHUYLER, JR.
Attesting Officer                                        Commissioner of Patents